(12) United States Patent
Priefert (10) Patent No.: US 10,517,268 B2
(45) Date of Patent: Dec. 31, 2019

(54) ANIMAL FEEDER AND ASSOCIATED SYSTEMS AND METHODS

(71) Applicant: Priefert Mfg. Co, Inc., Mt Pleasant, TX (US)

(72) Inventor: Edward D. Priefert, Mt. Pleasant, TX (US)

(73) Assignee: Priefert Mfg. Co, Inc., Mt Pleasant, TX (US)

( * ) Notice: Subject to any disclaimer, the term of this patent is extended or adjusted under 35 U.S.C. 154(b) by 0 days.

(21) Appl. No.: 16/126,623

(22) Filed: Sep. 10, 2018

(65) Prior Publication Data

US 2019/0000037 A1    Jan. 3, 2019

Related U.S. Application Data

(63) Continuation of application No. 14/865,726, filed on Sep. 25, 2015, now Pat. No. 10,070,619.

(60) Provisional application No. 62/055,427, filed on Sep. 25, 2014.

(51) Int. Cl.
    *A01K 5/02*    (2006.01)

(52) U.S. Cl.
    CPC .......... *A01K 5/0291* (2013.01); *A01K 5/0225* (2013.01)

(58) Field of Classification Search
    CPC ...... A01K 5/0241; A01K 5/0225; A01K 5/02; A01K 5/00; A01K 5/025; A01K 15/02; A01K 1/0107
    See application file for complete search history.

(56) References Cited

U.S. PATENT DOCUMENTS

| | | | | |
|---|---|---|---|---|
| 5,299,529 A | * | 4/1994 | Ramirez | A01K 5/0291 119/51.11 |
| 6,575,117 B1 | * | 6/2003 | Rasmussen | A01K 5/0114 119/57.1 |
| 7,228,816 B2 | * | 6/2007 | Turner | A01K 5/0114 119/51.02 |
| 7,543,548 B1 | * | 6/2009 | Troyer, Jr. | A01K 5/0291 119/51.13 |
| 7,895,973 B1 | * | 3/2011 | Whelan | A01K 5/025 119/51.02 |
| 8,061,300 B2 | * | 11/2011 | McElroy, Jr. | A01K 1/0107 119/164 |
| 8,336,494 B2 | * | 12/2012 | McElroy, Jr. | A01K 1/0107 119/164 |
| 8,863,689 B2 | * | 10/2014 | Kalnay | A01K 11/006 119/51.02 |
| 9,585,366 B2 | * | 3/2017 | Ault | A01K 1/0107 |
| 2005/0061252 A1 | * | 3/2005 | Meeks | A01K 5/0114 119/51.02 |
| 2006/0070578 A1 | * | 4/2006 | Pavlik | A01K 5/01 119/51.11 |
| 2008/0029034 A1 | * | 2/2008 | Busbice | A01K 5/025 119/51.11 |
| 2008/0072834 A1 | * | 3/2008 | Makem | A01K 1/0107 119/169 |

(Continued)

*Primary Examiner* — Kristen C Hayes
(74) *Attorney, Agent, or Firm* — Davis, Brown, Koehn, Shors & Roberts, P.C.; Matthew Warner-Blankenship (57) ABSTRACT

An animal feeder for the feeding of animals in a remote location. The trough of the feeder has a retractable cover controlled by an actuator that is programmable to open the trough to allow feeding and close the trough to prevent feeding over desired intervals.

16 Claims, 10 Drawing Sheets

(56) References Cited

U.S. PATENT DOCUMENTS

| | | | |
|---|---|---|---|
| 2010/0064975 A1* | 3/2010 | McElroy, Jr. | A01K 1/0107 |
| | | | 119/61.55 |
| 2013/0036977 A1* | 2/2013 | Kalnay | A01K 5/02 |
| | | | 119/51.02 |
| 2015/0189855 A1* | 7/2015 | Norris | A01K 5/0291 |
| | | | 119/57.1 |

* cited by examiner

ANIMAL FEEDER AND ASSOCIATED SYSTEMS AND METHODS

CROSS-REFERENCE TO RELATED APPLICATION(S)

This application is a Continuation application of U.S. patent application Ser. No. 14/865,726 filed on Sep. 25, 2015, which claims priority from claims priority to U.S. Patent Application Ser. No. 62/055,427, filed Sep. 25, 2014, and incorporated in its entirety herein by this reference.

BACKGROUND OF THE INVENTION

The present invention relates generally to animal feeders and, more specifically, to animal self feeders adapted to be set in remote locations and programmable to be open for feeding during set intervals.

Feeders for animals are well known. Such feeders often have a reservoir for the feed material and an adjustable gate that controls the gravity feed of the feed material into a trough for ad libitem access by an animal. Such feeders, commonly called creep feeders, are typically located in pens or other enclosed areas for access only by domesticated animals confined within such spaces.

There is a need, however, for animal feeders for access and feeding of either undomesticated animals, such as deer, elk, moose, and the like, or by domesticated animals, such as cattle or sheep, that are in remote un-penned or loosely penned locations. One of the challenges of such feeders is the potential access to the feed material by undesired animals, such as raccoons and wild pigs.

SUMMARY OF THE INVENTION

The present invention consists of a animal creep feeder that is adapted to be set in remote locations and which is programmable to be open for feeding during predetermined intervals. The feeder has a feed reservoir protected from the elements. Feed material from the reservoir exits by gravity through a gate or chute to a feed trough. The gate is adjustable to adapt to diverse feed materials and to present the desired quantity of feed material in the feed trough. The feed trough has a moveable cover that is operated by a programmable timer to open the trough for feeding during pre-set intervals and close the trough to prevent feeding outside such intervals. The cover is adapted to reduce the likelihood of damage to the feeder by an undesired animal trying to gain access during the times when the trough is closed. A battery associated with the feeder provides electricity to operate the programmable timer and an actuator which closes and opens the cover of the trough. Preferably, the feeder includes a solar panel for recharging the battery and a rain sensor which overrides the programmable timer to close the trough when rain is detected to prevent water from damaging the feed material in the trough.

DETAILED DESCRIPTION

Figure 1:
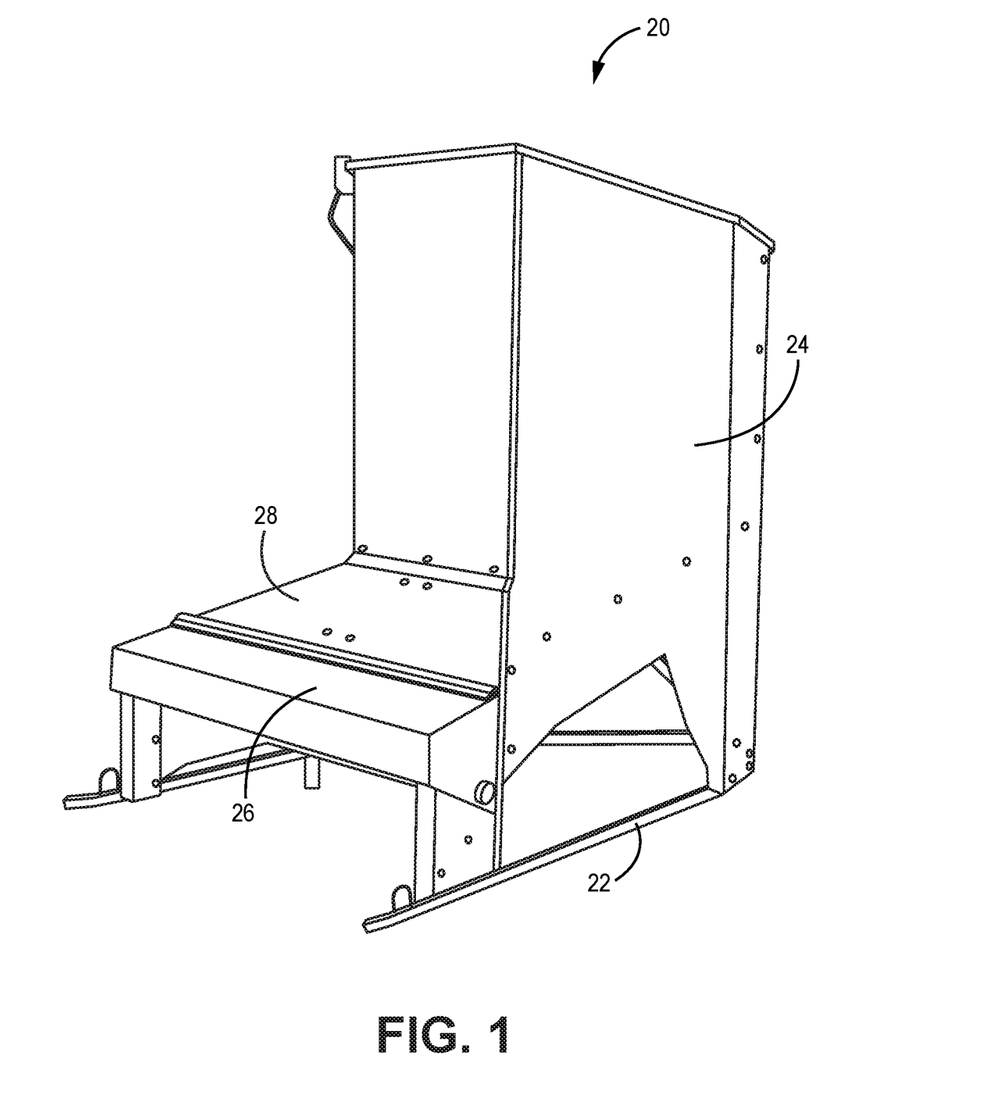
FIG. 1 is a front perspective view of a preferred embodiment of the present animal feeder invention.
Figure 2:
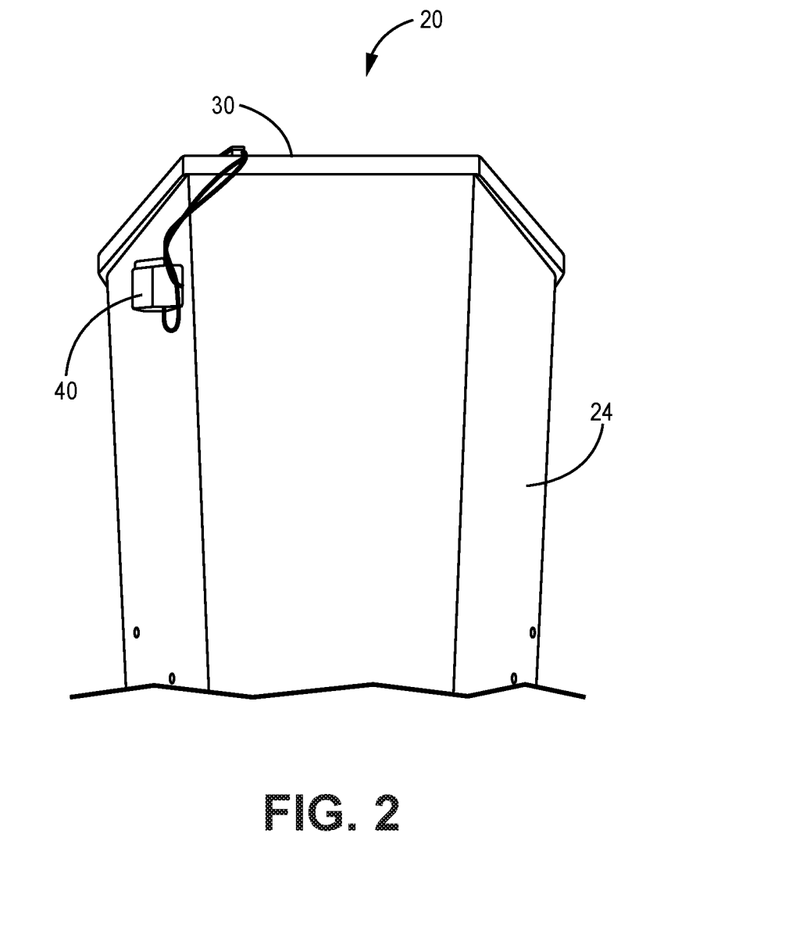
FIG. 2 is a front view of the upper portion of the animal feeder of FIG. 1.

Illustrated in FIG. 1, generally at 20, is a preferred embodiment of an animal feeder of the present invention. The animal feeder 20 is ground supported on a perimeter frame 22 and includes a feed hopper or reservoir 24 having a sloped floor (indicated by the bolts 26 on the side of the feeder 20) that directs by gravity feed in the hopper 24 to the front of the feeder 20. The feeder 20 also includes a transversely extended feed trough 26 and a feed chute 28 that directs feed from the hopper 24 to the trough 26. From a front view of the hopper 24 (FIG. 2), it can be seen that the hopper 24 is wider in the front than in the back. This feature allows an animal that is feeding at the feeder 20 to have a less obstructed view to the sides which is expected to make the animal more comfortable using the feeder 20. Visibility of the animal is also improved if the chute 28 flares laterally outwardly toward a laterally extended trough 26 (FIG. 1).

Figure 3:
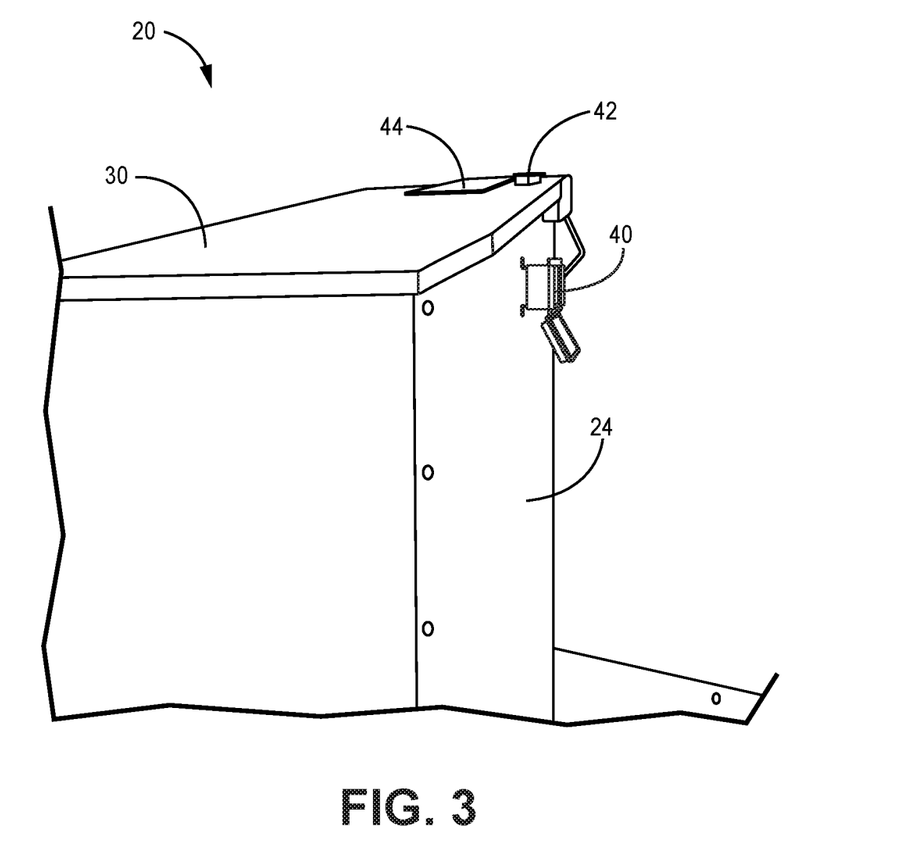
FIG. 3 is a back perspective view of the upper portion of the animal feeder of FIG. 1.
Figure 4:
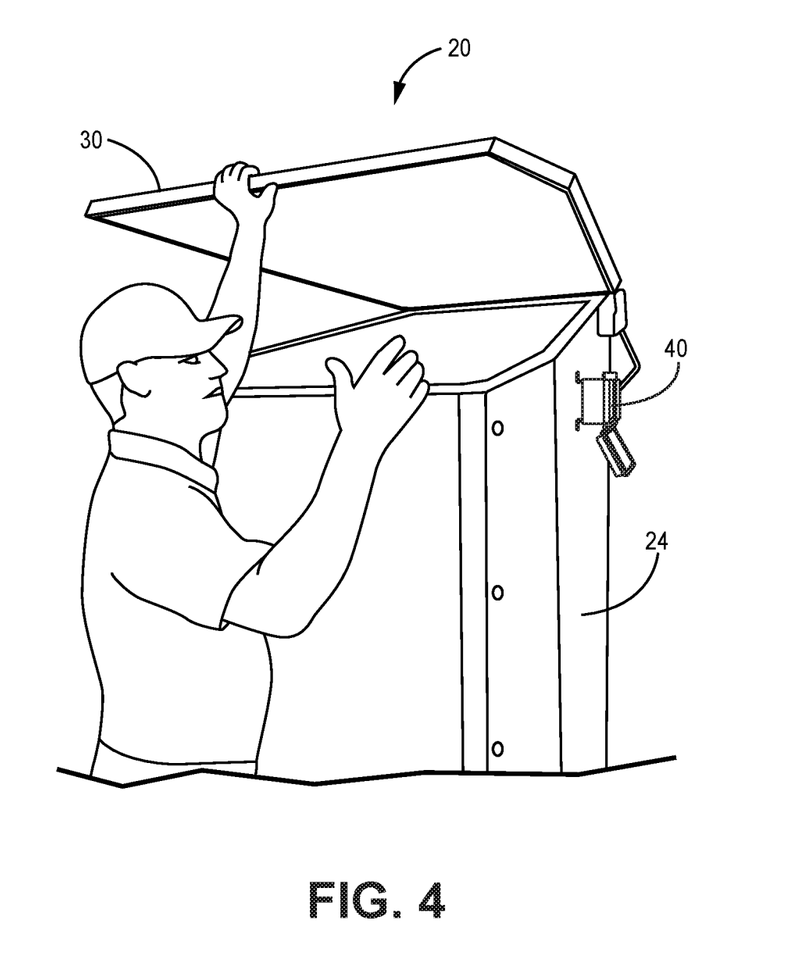
FIG. 4 is a back perspective view corresponding to FIG. 3 wherein the lid of the feed reservoir is raised.

The hopper 24 has a top cover 30 (FIG. 3) that is hinged at the front (FIG. 4) so that the cover 30 can be lifted at the front to allow access to the interior of the hopper 24 as necessary or desired. The cover 30 extends past the side walls of the hopper 24 and is sloped to prevent rain or snow from entering the hopper 24 and to allow the rain or snow to drain off the cover 30.

Figure 7:
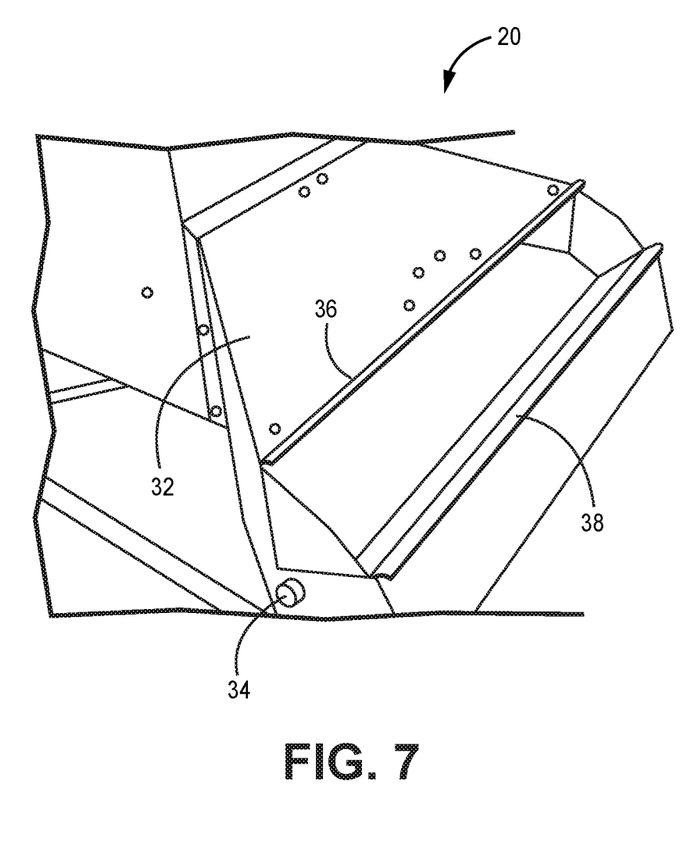
FIG. 7 is an upper perspective of a trough of the animal feeder of FIG. 1 with a cover for the trough in the open position.
Figure 8:
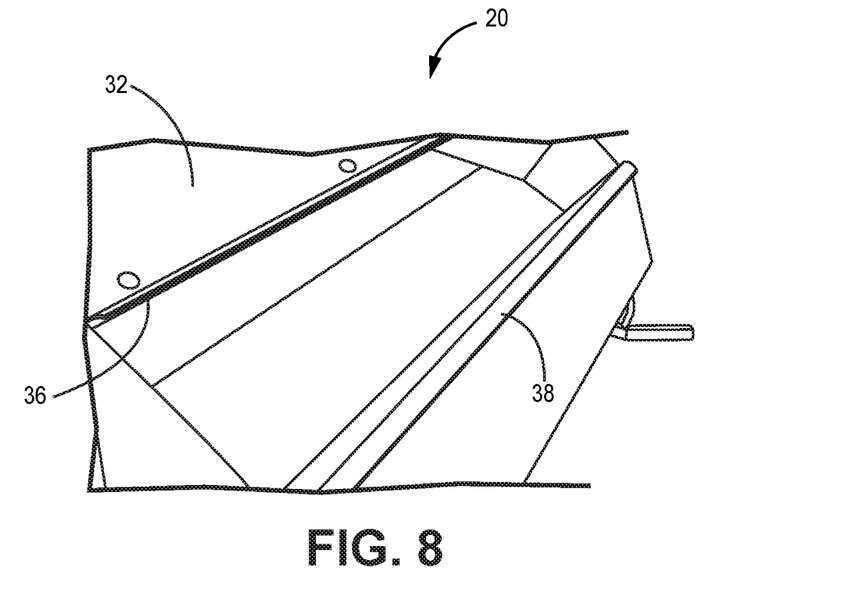
FIG. 8 is a close-up view corresponding to FIG. 7.
Figure 9:
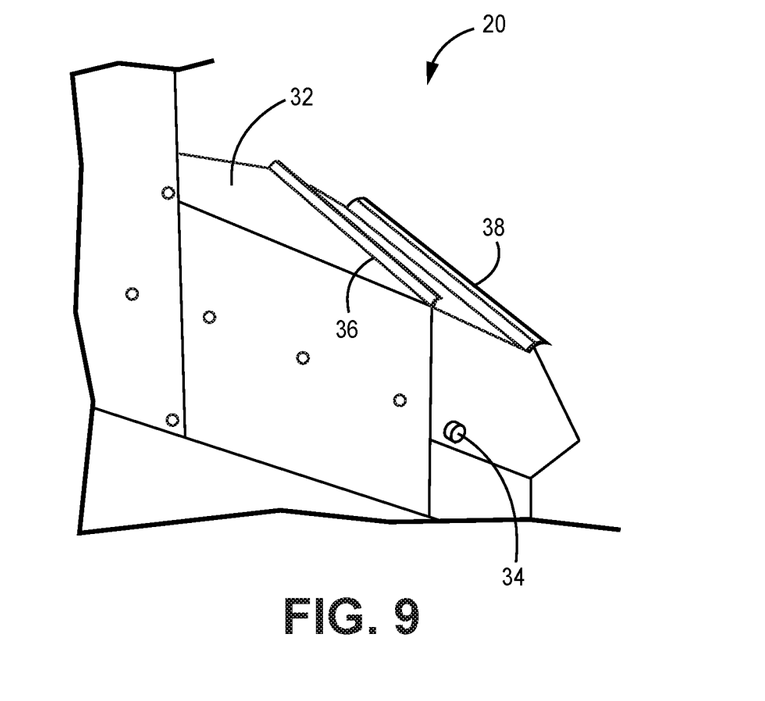
FIG. 9 is a side view showing the cover of the trough in transition from the open position to the closed position.
Figure 10:
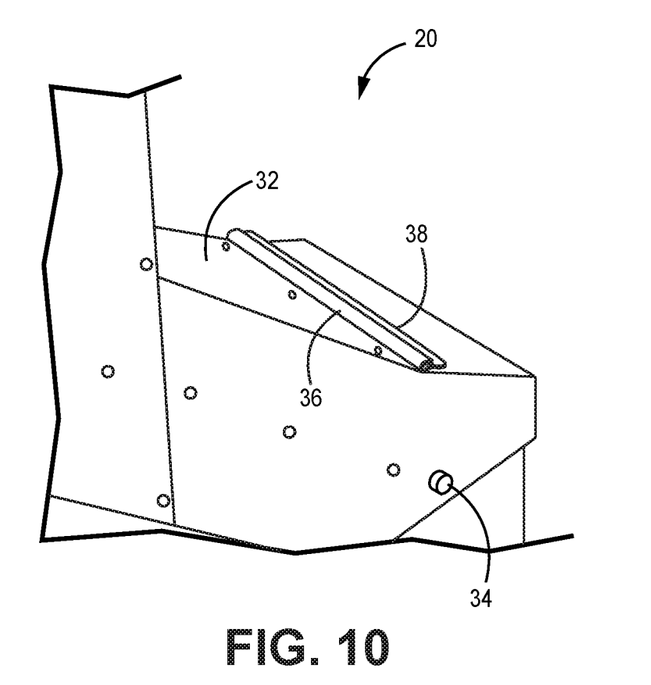
FIG. 10 is a side view showing the cover of the trough in the closed position.
Figure 11:
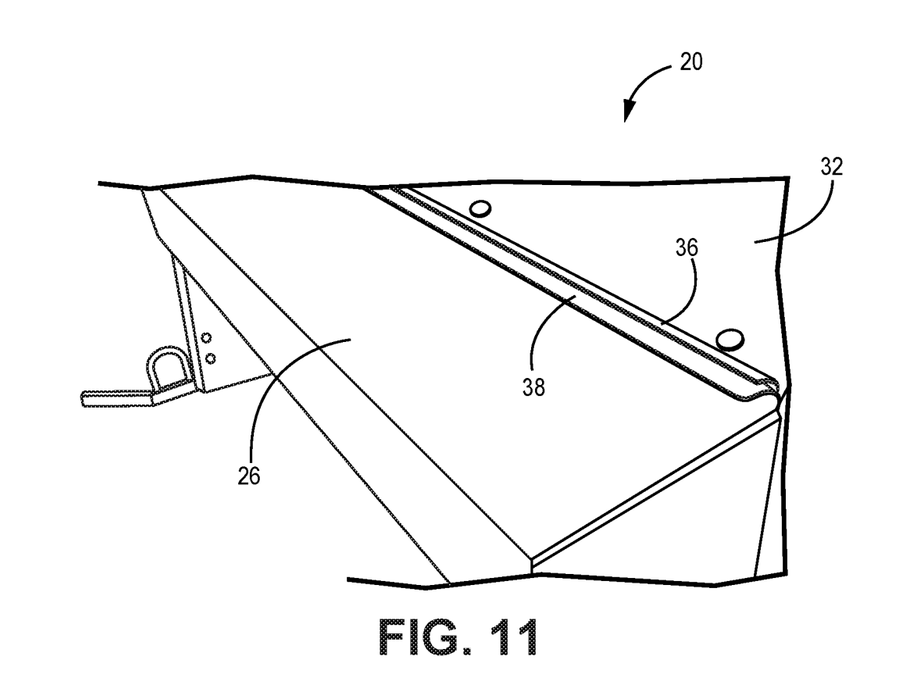
FIG. 11 is an upper side perspective view showing the cover of the trough in the closed position.

The feeder 20 has a cover 32 for the trough 26 that is moveable between a closed position covering the trough 26 (FIGS. 10 and 11) and an open position (FIGS. 1, 7 and 8) through intermediate positions such as shown in FIG. 9. In the preferred embodiment, the cover 32 is attached to the sides of the trough 26 with pins 34 (FIGS. 7, 9 and 10) that allow pivotal movement of the cover 32 between its open and closed positions. Movement of the cover between the open and closed positions is controlled by an electrical actuator (not shown) powered by a battery (not shown) to allow operation of the feeder 20 in remote locations.

The cover 32 has a rolled leading edge 36 that nests closely inside a corresponding rolled flange 38 (FIGS. 8 and 11) which acts to prevent an animal from prying open the cover 32 when in its closed position and helps to prevent water from entering the trough 26 when the cover 32 is in its closed position.

Figure 5:
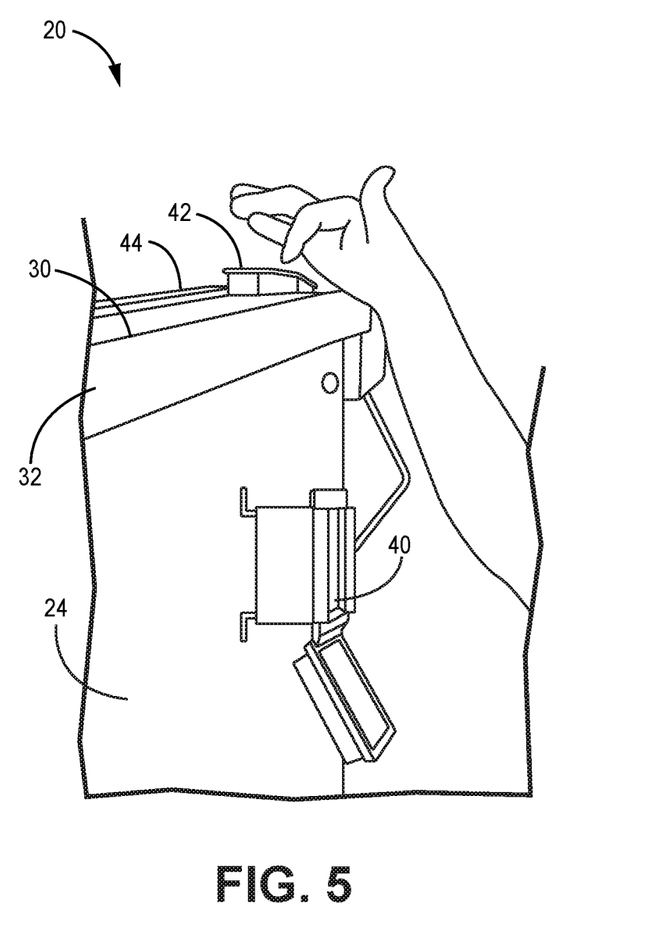
FIG. 5 is a close-up view of a programmable timer and a rain sensor associated with the animal feeder of FIG. 1.
Figure 6:
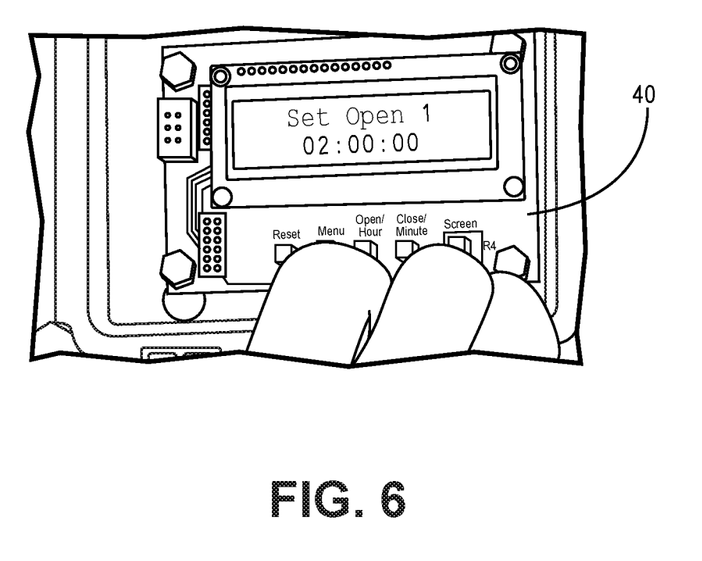
FIG. 6 is a close-up view of the face of the programmable timer.

In a preferred embodiment, opening and closing of the cover 32 is controlled by a timer 40 mounted on the side of the feeder 20 (FIG. 5). The timer 40 is programmable by a user (FIG. 6) to permit control over the times that the feeder 20 is accessible by animals for feeding. To prevent excessive spoilage of the feed in the trough 26 from rain or snow, a water sensor 42 is preferably mounted on the top cover 30. If the water sensor 42 is exposed to water, it will send a signal to the timer 40 overriding the program of the timer 40 and, if open, moving the cover 32 to close the trough 26. When water is no longer present on the water sensor 42, control is returned to the program of the timer 40.

Figure 12:
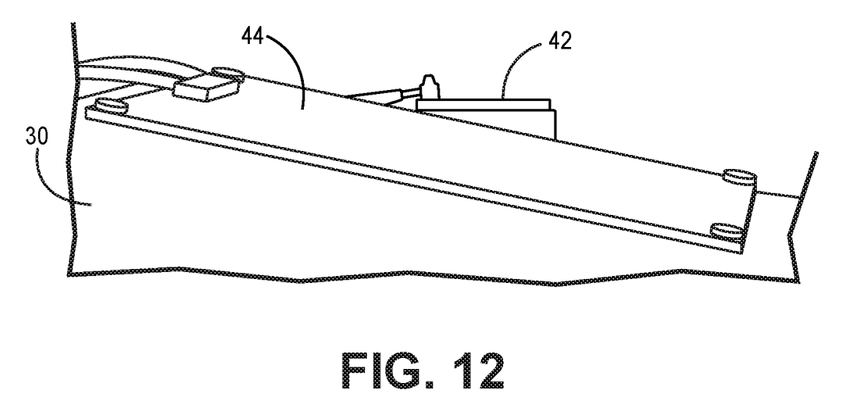
FIG. 12 is a side view of a solar panel associated with the animal feeder of FIG. 1.

In certain implementations, a solar panel 44 is also mounted on the cover 30 and serves to recharge the battery so that the animal feeder 20 will have an extended period of operation.

A common use of the animal feeder 20 is to feed deer and thereby attract them to the vicinity of a hunting stand. Of course, other less desirable or even undesirable, animals will also be attracted to the animal feeder 20. In the southern US, wild hogs are particularly prevalent and can be a nuisance. The animal feeder 20 is preferably constructed of materials strong enough to resist damage by hogs trying to access the trough 26 when closed, and in particular the trough cover 32.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

I claim:

1. An animal feeder comprising:
   a. a feed trough;
   b. a feed hopper disposed above the feed trough;
   c. a cover movable between an open and a closed position on the feed trough, the cover further comprising a rolled edge that couples a curved flange on the feed trough when the cover is in the closed position; and
   d. a timer in operable communication with the cover for moving the cover between the open and the closed position at pre-programmed intervals.

2. The animal feeder of claim 1, further comprising a lid pivotably engaged with the feed hopper.

3. The animal feeder of claim 2, wherein the lid is sloped.

4. The animal feeder of claim 3, further comprising a rain sensor.

5. The animal feeder of claim 3, further comprising a solar panel disposed on the lid for supplying power to the animal feeder.

6. An animal feeder comprising:
   a. a frame;
   b. a feed reservoir having a sloped floor and a hinged top cover;
   c. a trough below the feed reservoir;
   d. a feed chute directing feed from the feed reservoir to the trough; and
   e. a moveable cover for the trough movable between an open position and a closed position via an actuator.

7. The animal feeder of claim 6, wherein the feed chute flares laterally with respect to the feed reservoir toward the trough.

8. The animal feeder of claim 7, wherein the moveable cover is attached to the trough via pins.

9. The animal feeder of claim 8, wherein the actuator is an electrical actuator.

10. The animal feeder of claim 9, further comprising a water sensor that provides a signal to move the moveable cover from the open position to the closed position when water is present on the water sensor.

11. An animal feeder comprising:
    a. a hopper for storage of feed;
    b. a trough engaged with the hopper via an angled chute;
    c. a cover pivotable between an open position and a closed position on the trough;
    d. a timer;
    e. a battery; and
    f. an actuator,
    wherein the cover pivots between the open position and closed position via the actuator powered by the battery and activated by the timer and the trough further comprises a rolled flange corresponding to a rolled edge of the cover.

12. The animal feeder of claim 11, further comprising a water sensor.

13. The animal feeder of claim 12, wherein the water sensor overrides the timer when water is sensed causing the cover to move into the closed position.

14. The animal feeder of claim 13, further comprising a solar panel for recharging the battery.

15. The animal feeder of claim 14, wherein the rolled flange prevents water from entering the trough when the cover is in the open position.

16. The animal feeder of claim 15, wherein the feed is deer feed.

* * * * *